Patented Apr. 29, 1952

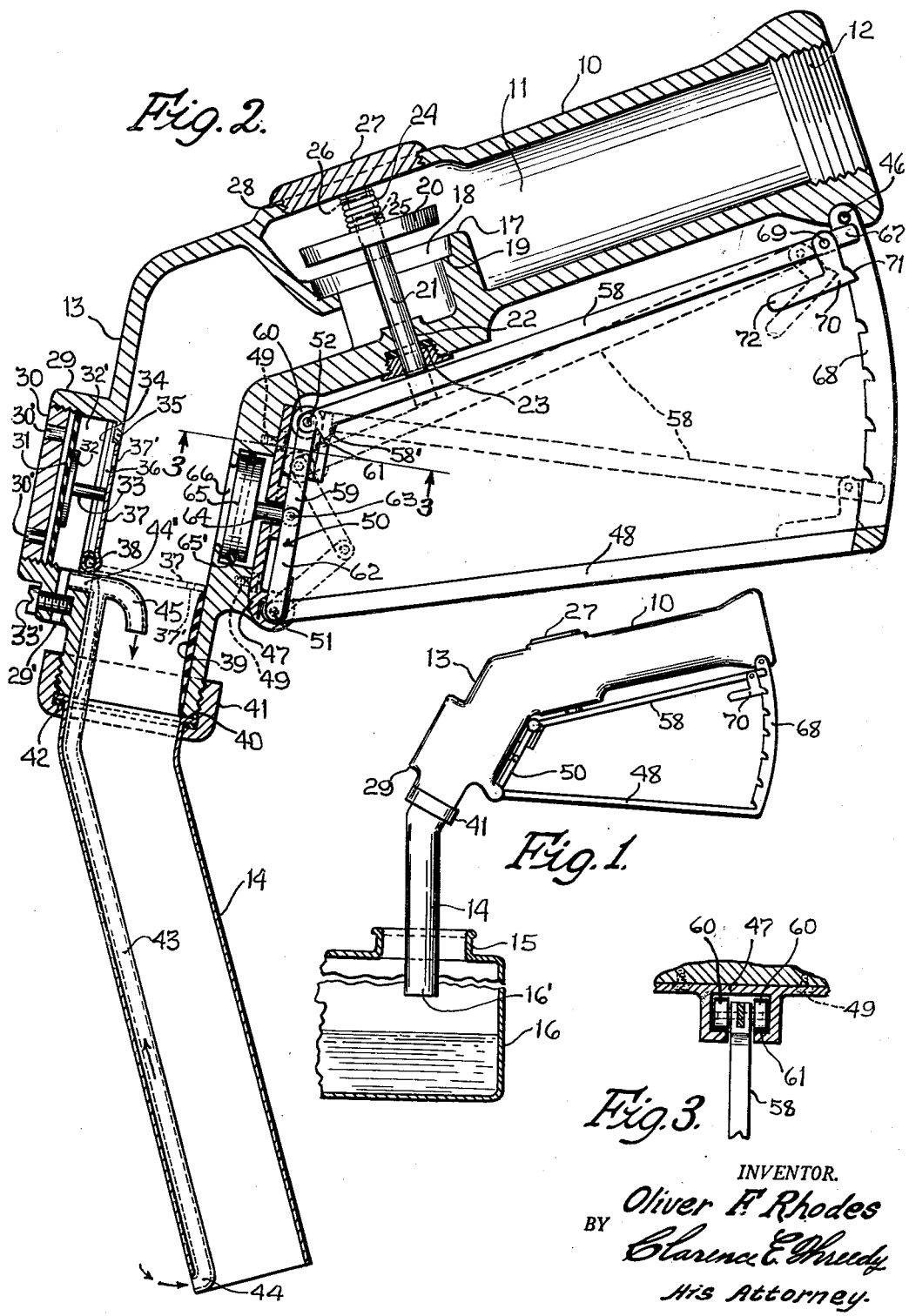

2,595,166

UNITED STATES PATENT OFFICE 2,595,166

LIQUID LEVEL CONTROLLED FILLING SPOUT

Oliver F. Rhodes, Peru, Ind.

Application January 6, 1951, Serial No. 204,710

6 Claims. (Cl. 226—127)

This invention relates to certain new and useful improvements in liquid level controlled filling spouts and has for its principal object the provision of an improved and simplified and inexpensive arrangement for automatically shutting off the flow of fluid from a supply tank to a container or other receptacle when the liquid delivered to such container or other receptacle from the supply tank has reached within the container or other receptacle a predetermined level, thereby preventing overflowing of the liquid from the container or other receptacle. The present invention constitutes an improvement over that shown in Patent No. 2,504,450 granted to me on April 18, 1950, on my invention in a liquid level controlled filling spout.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a side elevational view of the invention showing the same applied to a tank or other receptacle fragmentarily shown in sectional detail, the parts of the filling spout being shown in fluid dispensing position;

Fig. 2 is an enlarged longitudinal sectional detail view of the spout embodied in the invention, the parts of the filling spout embodied in the invention being shown in fluid dispensing position; and Fig. 3 is a fragmentary sectional detail view taken substantially on line 3—3 of Fig. 2.

The drawings illustrate the preferred form of construction by which the several objects of my invention are accomplished.

In this connection, the filling spout includes a handle 10 having a passage 11 formed therein threaded at one end as at 12 for connection with a supply conduit or hose. The opposite end portion of the handle terminates into a tubular portion 13 from which extends a nozzle 14 adapted to be projected through the filling neck 15 of a tank or container 16 to which liquid is adapted to be supplied.

In the handle 10 there is provided a partition 17 having an opening 18 formed therein and through which communication is had between the passage 11 and the tubular portion 13. A suitable valve seat 19 is provided for the reception of a valve disc 20 to close communication between the passage 11 and the tubular portion 13. This valve disc 20 is formed as a part of a shaft 21 slidably projected through an opening 22 formed in a wall of the housing 10. In this opening 22 is a suitable packing ring 23 through which the shaft 21 slidably projects. The valve disc 20 is urged into valve closing position by an expansion spring 24 encircling confronting studs 25 and 26. The stud 25 is formed as a part of the valve disc 20 while the stud 26 is formed as a part of a plug 27 threaded into an opening 28 formed in a wall 10 of the handle. When the plug 27 is removed the valve assembly including the valve disc 20 may be quickly and easily assembled.

The tubular portion 13 provides a lateral ring 29 having a removable cap 30. Within this ring 29 is provided a diaphragm 31. This diaphragm 31 is adapted to bear upon a disc 32 formed as an integral part of a stud shaft 33, journaled in a suitable bearing 34 formed as an integral part of the partition 35. An opening 36 is formed in a wall of the tubular portion 13 and is normally closed by a valve gate 37. The stud shaft 33 is normally in engagement with this gate 37. Such gate is hinged to the tubular portion by a hinge 38. This hinge is of a spring type normally effective to hold the valve gate in the position shown in Fig. 2. When moved to an opening position as shown in dotted lines in Fig. 2, the valve gate is adapted to seat against a valve sleeve 39 arranged in the end portion of the tubular portion 13. The nozzle 14 may be attached to the tubular portion 13 in any approved manner. In the instant case, the nozzle provides an angular flange 40 disposed between a nut 41 and the end of the tubular portion 13, there being a suitable packing ring 42 provided between the flange 40 and the nut 41. Arranged in the nozzle 14 is a tube 43 having an angled end portion 44 opening laterally from the extremity of the nozzle 14. The opposite end portion of the tube 43 has an extension 44' which opens into the space between the diaphragm 31 and the partition 35. The tube 43 also provides an extension 45 which opens in the direction of the nozzle 14.

An air inlet 29' is provided in the ring and communicates with the diaphragm chamber 32'. Air through this inlet is regulated by a set screw 33' the adjustment of which will permit the diaphragm 31 to operate under a higher or lower pressure as required.

Secured to the handle 10 as at 46 and to a plate 47 is a hand guard 48. The plate 47 is secured to the tubular portion as at 49. One end portion of a toggle 50 is pivoted as at 51 to the plate 47, the other end portions of the toggle are pivoted as at 52 to an operating rod 58. The link 59 of the toggle carries opposite rollers 60 which move in a raceway 61 provided by the plate 47. The link 59 of the toggle is pivotally connected to the link 62 of the toggle as at 63. Bearing upon the pivot point 63 between links 59 and 62 of the toggle is a stud shaft 64 carried by a piston 65 carrying a neopreme ring 65' and arranged in an opening 66 formed in the tubular portion 13.

The operating rod 58 has an end portion 67 which moves between spaced rails 68 of the handle 43. On this operating rod 58 is pivotally connected as at 69 a latch 70 adapted to engage the notches 71 formed in corresponding edges of rails 68. This latch 70 is pivoted toward these notches by a counterweight 72 which is an extension of the latch and serves to facilitate manually pivoting the latch from engagement with a notch 71 when occasion requires.

In the valve gate 37 is a bleeder opening 37' for reasons hereinafter set forth.

When the flow of liquid is shut off through the spout the various parts are in the position shown in dotted lines in Fig. 2. The operator, after placing the nozzle 14 into the container 16, grasps the handle 10 firmly in his hand with his fingers embracing the operating rod 58 so as to pivot such rod from the dotted line position to the full line position shown in Fig. 2. This movement of the rod 58 moves the valve disc 20 to an open position and disposes the links of the toggle 50 in alignment with respect to each other. The valve gate 37 by its spring hinge 58 is disposed in the position shown in Fig. 2. The parts in the above described position permit the flow of liquid into the container 16. Until the end 16' of the nozzle 14 becomes submerged in the liquid within the tank 16, air will be admitted into the tube 43 and expelled through the extension 37' in the direction shown by the arrows. When, however, the end 16' of the nozzle is submerged in the liquid the flow of air into the tube 43 is blocked and a vacuum is created within the ring 29, causing the diaphragm 31 to collapse, there being provided in the cap 30 a pair of passages 30'. The collapsing of this diaphragm 31 bears the stud 33 against the door 37 pivoting the gate into the path of flow of liquid with the result that the force of the flowing liquid will move the valve gate 37 to closing position shown in dotted lines Fig. 2, thus shutting off the flow of liquid through the nozzle 14. The pressure of the liquid will therefore bear upon the piston 65 moving the piston outwardly to bear the stud 64 against the toggle 50 whereupon when the point 63 is moved beyond a long axis through the links, the toggle will collapse to the position shown in dotted lines Fig. 2, with the result that the spring 24 will move the valve disc 20 upon the seat, closing the flow of liquid from the passage 11 into the tubular portion 13. As the toggle 50 is collapsed, the latch 70 will be disengaged from the notch 71, thereby permitting the rod 58 to drop into the position shown in dotted lines in Fig. 2, in which position it remains until again manually reset to its former full line position as shown in Fig. 2.

As soon as the liquid trapped between the gate 37 and the closed valve disc 20 bleeds through the opening 37' the gate 37 under the action of the spring hinge 58 will move back to its normal full line position shown in Fig. 2.

On the rod 58 is a lug 58' which in the resetting operation of the toggle engages the toggle link 59 to effect such resetting of the toggle.

The foregoing construction provides a filling spout which is effective to prevent the overflowing of liquid from a container which would result from delivering to such container more fluid than the container can hold.

The arrangement of the parts with respect to each other is relatively simple and positive in their respective operations.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A filling spout comprising a handle having a passage therein and terminating into a tubular portion, a valve structure arranged between the passage and the tubular portion for controlling the flow of liquid from the passage into the tubular portion, a hand guard having one end portion connected to the handle and an opposite end portion connected to the tubular portion, an operating rod effective for opening the valve of said valve structure, a toggle structure having one end portion pivotally connected to the tubular portion and provided at its opposite end portion with a roller, a raceway for said roller carried by said tubular portion, one end portion of said operating rod being pivotally connected to the roller bearing end of the toggle structure, said rod extending lengthwise with respect to the handle and having an end portion providing a latch, said hand guard providing a plurality of notches adapted to be selectively engaged by the latch, a cylinder provided by said tubular portion at one side thereof, a piston in said cylinder including a stud shaft adapted to engage centrally said toggle, and means in said tubular portion for cutting off the flow of liquid from said tubular portion to effect operation of the piston to move the shaft thereof against the toggle to collapse the latter and disengage the latch of said rod from one of said notches to effect pivotal movement of said rod under the action of said valve structure.

2. A filling spout comprising a handle having a passage therein and terminating into a tubular portion, a valve structure arranged between the passage and the tubular portion for controlling the flow of liquid from the passage into the tubular portion, a hand guard having one end portion connected to the handle and an opposite end portion connected to the tubular portion, an operating rod effective for opening the valve of said valve structure, a toggle structure having one end portion pivotally connected to the tubular portion and provided at its opposite end portion with a roller, a raceway for said roller carried by said tubular portion, one end portion of said operating rod being pivotally connected to the roller bearing end of the toggle structure, said rod extending lengthwise with respect to the handle and having an end portion providing a latch, said hand guard providing a plurality of notches adapted to be selectively engaged by the latch, a cylinder provided by said tubular portion at one side thereof, a piston in said cylinder including a stud shaft adapted to engage centrally said toggle, means in said tubular portion for cutting off the flow of liquid from said tubular portion to effect operation of the piston to move the shaft thereof against the toggle to collapse the same and disengage the latch of said rod from one of said notches to effect pivotal movement of said rod under the action of said valve structure and said last-named means including a diaphragm actuated valve gate adapted to be moved by the flow of liquid through said tubular portion into closing position with respect thereto.

3. A filling spout comprising a handle having a passage therein and terminating into a tubular portion, a valve structure arranged between the passage and the tubular portion for controlling the flow of liquid from the passage into the tubular portion, a hand guard having one end portion connected to the handle and an opposite end portion connected to the tubular portion, an operating rod effective for opening the valve of said valve structure, a toggle structure having one end portion pivotally connected to the tubular portion and provided at its opposite end portion with a roller, a raceway for said roller carried by said tubular portion, one end portion of said operating rod being pivotally connected to the roller bearing end of the toggle structure, said rod extending lengthwise with respect to the handle and having an end portion providing a latch, said hand guard providing a plurality of notches adapted to be selectively engaged by the latch, a cylinder provided by said tubular portion at one side thereof, a piston in said cylinder including a stud shaft adapted to engage centrally said toggle, means in said tubular portion for cutting off the flow of liquid from said tubular portion to effect operation of the piston to move the shaft thereof against the toggle to collapse the same and disengage the latch of said rod from one of said notches to effect pivotal movement of said rod under the action of said valve structure, said last-named means including a diaphragm actuated valve gate adapted to be moved by the flow of liquid through said tubular portion into closing position with respect thereto, and means for effecting operation of the diaphragm which actuates said gate.

4. A filling spout comprising a handle having a passage therein and terminating into a tubular portion, a valve structure arranged between the passage and the tubular portion for controlling the flow of liquid from the passage into the tubular portion, a hand guard having one end portion connected to the handle and an opposite end portion connected to the tubular portion, an operating rod effective for opening the valve of said valve structure, a toggle structure having one end portion pivotally connected to the tubular portion and provided at its opposite end portion with a roller, a raceway for said roller carried by said tubular portion, one end portion of said operating rod being pivotally connected to the roller bearing end of the toggle structure, said rod extending lengthwise with respect to the handle and having an end portion providing a latch, said hand guard providing a plurality of notches adapted to be selectively engaged by the latch, a cylinder provided by said tubular portion, a piston in said cylinder including a stud shaft adapted to engage centrally said toggle, means in said tubular portion for cutting off the flow of liquid from said tubular portion to effect operation of the piston to move the shaft thereof against the toggle to collapse the same and disengage the latch of said rod from one of said notches to effect pivotal movement of said rod under the action of said valve structure, said last-named means including a diaphragm actuated valve gate adapted to be moved by the flow of fluid through said tubular portion into closing position with respect thereto, means for effecting operation of the diaphragm, said last-named means including a chamber provided by said tubular portion and in which said diaphragm is arranged, and means for creating a vacuum in said chamber to collapse said diaphragm.

5. A filling spout comprising a handle having a passage therein and terminating into a tubular portion, a valve assembly arranged between the passage and the tubular portion for controlling the flow of liquid from the passage into the tubular portion, a nozzle extending from the tubular portion, a diaphragm chamber including a diaphragm arranged on the tubular portion, a valve member normally disposed to be acted upon by the diaphragm of said diaphragm chamber, a cylinder, a piston in said cylinder, a toggle having one link portion pivoted to the tubular portion and providing on the outer link portion a pair of rollers said toggle extending transversely of the path of movement of said piston and adapted to be collapsed thereby, a raceway carried by the tubular portion for said rollers, a hand guard connected at one end to the handle and at its opposite end to the tubular portion, an operating rod having one end portion connected to the roller bearing link of said toggle and carrying at its opposite end portion a latch member, said hand guard having a plurality of notches formed therein adapted to be selectively engaged by the latch, said valve assembly including a shaft engagable by said bar, and a conduit member arranged in said nozzle with one end portion opening at the other extremity thereof and its inner end portion provided with an extension communicating with said first-named diaphragm chamber and another extension communicating with the inner end portion of said nozzle.

6. A filling spout comprising a handle having a passage therein and terminating into a tubular portion, a valve arranged between the passage and the tubular portion for shutting off the flow of liquid from the passage to the tubular portion, manually operated means for moving the valve to an open position within said passage, latch means for releasably latching said valve moving means in a position to maintain the valve in said open position, pressure-responsive means for releasing said latch means to permit movement of said valve moving means to close said valve, a valve member pivoted within said tubular portion and movable into and from the path of flow of liquid through the tubular portion, vacuum-actuated means for initially pivoting said valve member in position to be acted upon by the pressure of the flow of liquid through the tubular portion and moved thereby into closed position with respect to the tubular portion, to create back pressure of said liquid to effect operation of said pressure-responsive means.

OLIVER F. RHODES.

REFERENCES CITED

The following references are of record in the file of this patent:

UNITED STATES PATENTS

| Number | Name | Date |
| --- | --- | --- |
| 2,363,123 | Franck | Nov. 21, 1944 |
| 2,504,450 | Rhodes | Apr. 18, 1950 |